(12) United States Patent
Jin

(10) Patent No.: US 11,899,417 B2
(45) Date of Patent: Feb. 13, 2024

(54) METHODS AND APPARATUS TO IMPLEMENT PREDICTIVE ANALYTICS FOR CONTINUOUS CONTROL SYSTEM PROCESSES

(71) Applicant: Fisher-Rosemount Systems, Inc., Round Rock, TX (US)

(72) Inventor: Zuwei Jin, Royersford, PA (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 16/401,919

(22) Filed: May 2, 2019

(65) Prior Publication Data
US 2020/0348636 A1    Nov. 5, 2020

(51) Int. Cl.
*G05B 19/042*    (2006.01)
*G06N 5/02*    (2023.01)

(52) U.S. Cl.
CPC .............. *G05B 19/042* (2013.01); *G06N 5/02* (2013.01); *G05B 2219/24075* (2013.01)

(58) Field of Classification Search
CPC ......... G06F 30/20; G06F 17/18; G05B 17/02; G05B 19/4184; G05B 23/024; G05B 23/0243; G05B 19/418; G05B 19/41875; G05B 19/41885; G05B 19/042;
(Continued)

(56) References Cited

U.S. PATENT DOCUMENTS

| 6,885,907 B1* | 4/2005 | Zhang ................... B22D 11/16 |
| | | 164/151.5 |
| 7,346,402 B1 | 3/2008 | Stahl |
| 9,158,295 B2 | 10/2015 | Blevins et al. |

(Continued)

FOREIGN PATENT DOCUMENTS

| CN | 101770209 A | 7/2010 |
| CN | 101908495 A | 12/2010 |

(Continued)

OTHER PUBLICATIONS

Intellectual Property Office of the United Kingdom, "Search Report," issued in connection with GB application No. 2005563.8, dated Oct. 19, 2020, (3 pages).

(Continued)

*Primary Examiner* — Christopher E. Everett
*Assistant Examiner* — Tameem D Siddiquee
(74) *Attorney, Agent, or Firm* — Hanley, Flight & Zimmerman, LLC

(57) ABSTRACT

Methods and apparatus to implement predictive analytics for continuous processes are disclosed. An example apparatus includes a virtual batch unit controller to implement a sampling batch on a virtual batch unit. The sampling batch corresponds to a discrete period of time of a continuous control system process. The virtual batch unit includes input and output parameters corresponding to parameters associated with the continuous control system process. The example apparatus further includes a sampling batch analyzer to generate predictive analytic information indicative of a predicted quality of an output of the continuous control system process at an end of the discrete period of time based on an analysis of the sampling batch relative to an analytical model.

23 Claims, 10 Drawing Sheets

(58) Field of Classification Search
CPC ........... G05B 2219/24075; Y02P 90/14; Y02P 90/18; Y02P 90/22; Y02P 90/26; G06N 5/02

See application file for complete search history.

(56) References Cited

U.S. PATENT DOCUMENTS

| | | | |
|---|---|---|---|
| 10,116,795 B1* | 10/2018 | Chishti | G06Q 10/06311 |
| 2004/0172153 A1* | 9/2004 | Zhang | B22D 11/161 |
| | | | 700/146 |
| 2006/0155412 A1 | 7/2006 | Ikeda | |
| 2007/0078530 A1* | 4/2007 | Blevins | G05B 13/041 |
| | | | 700/29 |
| 2008/0066019 A1* | 3/2008 | Worek | G05B 19/4183 |
| | | | 700/17 |
| 2009/0011515 A1* | 1/2009 | Soleta | G01N 21/3577 |
| | | | 436/104 |
| 2010/0318934 A1* | 12/2010 | Blevins | G05B 19/41875 |
| | | | 715/772 |
| 2011/0288660 A1* | 11/2011 | Wojsznis | G05B 23/024 |
| | | | 700/30 |
| 2016/0268811 A1* | 9/2016 | Bell | H02J 4/00 |
| 2016/0285711 A1* | 9/2016 | Akidau | H04L 47/28 |
| 2017/0030953 A1* | 2/2017 | Nelson | G05B 19/00 |
| 2017/0083012 A1 | 3/2017 | Murray | |
| 2017/0177754 A1* | 6/2017 | Jin | G05B 19/4184 |

FOREIGN PATENT DOCUMENTS

| | | |
|---|---|---|
| CN | 101963802 A | 2/2011 |
| CN | 102298319 A | 12/2011 |
| CN | 103116274 A | 5/2013 |
| CN | 103458068 A | 12/2013 |
| CN | 103777627 A | 5/2014 |
| CN | 106094568 A | 11/2016 |
| CN | 106896800 A | 6/2017 |
| CN | 106933105 A | 7/2017 |
| CN | 109143992 A | 1/2019 |
| GB | 2496040 | 5/2013 |
| GB | 2493867 | 11/2017 |
| GB | 2 565 875 A | 2/2019 |

OTHER PUBLICATIONS

Office Action for Chinese Patent Application No. 202010367757.X, dated Jul. 14, 2023.

* cited by examiner

US 11,899,417 B2

METHODS AND APPARATUS TO IMPLEMENT PREDICTIVE ANALYTICS FOR CONTINUOUS CONTROL SYSTEM PROCESSES

FIELD OF THE DISCLOSURE

This disclosure relates generally to process control systems, and, more particularly, to methods and apparatus to implement predictive analytics for continuous processes.

BACKGROUND

Process control systems may be implemented as either batch process control or continuous process control. Batch process control involves the processing of a particular batch that is associated with a particular quantity of materials being processed for a particular duration to produce an output product as an end result. Thus, batch processes have a defined beginning and ending (a discrete period of time) corresponding to the time needed to process the materials fed into the system at the start and produce the final output product. By contrast, continuous process control involves processing material to produce an output product on a continuous basis. Thus, the duration of a continuous process can extend for any specified period of time (theoretically indefinitely) with an ever increasing amount of the output product being produced as the duration increases.

SUMMARY

Example methods and apparatus to implement predictive analytics for continuous processes are disclosed. An example apparatus includes a virtual batch unit controller to implement a sampling batch on a virtual batch unit. The sampling batch corresponds to a discrete period of time of a continuous control system process. The virtual batch unit includes input and output parameters corresponding to parameters associated with the continuous control system process. The example apparatus further includes a sampling batch analyzer to generate predictive analytic information indicative of a predicted quality of an output of the continuous control system process at an end of the discrete period of time based on an analysis of the sampling batch relative to an analytical model.

An example non-transitory computer readable medium includes instructions that, when executed, cause a machine to at least implement a sampling batch on a virtual batch unit. The sampling batch corresponds to a discrete period of time of a continuous control system process. The virtual batch unit includes input and output parameters corresponding to parameters associated with the continuous control system process. The example instructions further cause the machine to generate predictive analytic information indicative of a predicted quality of an output of the continuous control system process at an end of the discrete period of time based on an analysis of the sampling batch relative to an analytical model.

An example method includes implementing a sampling batch on a virtual batch unit. The sampling batch corresponds to a discrete period of time of a continuous control system process. The virtual batch unit includes input and output parameters corresponding to parameters associated with the continuous control system process. The example method further includes generating predictive analytic information indicative of a predicted quality of an output of the continuous control system process at an end of the discrete period of time based on an analysis of the sampling batch relative to an analytical model.

BRIEF DESCRIPTION OF THE DRAWINGS

The figures are not to scale. In general, the same reference numbers will be used throughout the drawing(s) and accompanying written description to refer to the same or like parts.

Figure 1:
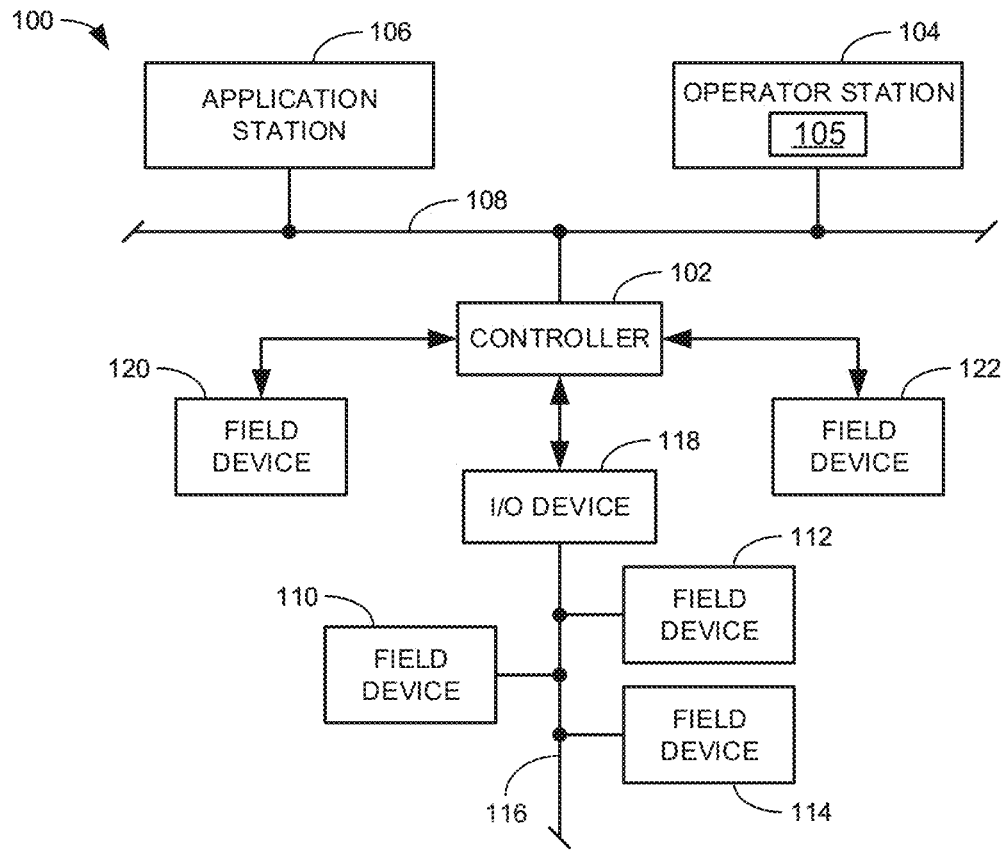
FIG. 1 is a schematic illustration of an example process control system.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Frequently, batch control analytics are implemented during the execution of a batch process to improve and/or maintain the safety, performance, and/or efficiency of the batch process by enabling fault detection and quality prediction of the process in substantially real-time. More particularly, in some instances, batch control analytics involve the multi-variate analysis of a batch process relative to models of the batch process generated from previously executed (e.g., historically archived) batch processes. Common tools used to create statistical models for batch analytics include Principle Component Analysis (PCA) and Projection on Latent Structures (PLS) (also known as Partial Least Squares).

While batch analytics enable fault detection and quality prediction of the output product during a batch process, similar analytics are unavailable for continuous process control. Among other things, PCA and PLS (used in batch analytics) cannot account for dynamic behavior in a continuous system that deviates from a steady state and which is then restored to a steady state. In particular, in a continuous process system, deviations in a steady state are detected and corrected based on changes to processing parameters over time. Thus, the response of a continuous process to deviation is transient or time-based. However, PCA and PLS do not include a time dimension and, therefore, are unsuitable for direct application to continuous steady-state process control systems. A potential approach to provide predictive analytics to a continuous process control system is to rely on the physical mechanisms of the process and time-dependent analyses based on, for example, differential equations to develop analytical models. However, such an approach is unlikely to produce reliable models due to challenges in training such models because of the nonlinearity and the sensitivity of the dynamic behavior in such differential equations.

Examples disclosed herein enable predictive analytics for continuous process control systems using batch-like analytic techniques. More particularly, examples disclosed herein specify contiguous and discrete temporal portions of a continuous process that can be analogized to a series or campaign of successive batch processes. Each discrete temporal portion of the continuous process is referred to herein as a sampling batch to distinguish it from a typical batch associated with an actual batch process. By dividing a continuous process into multiple discrete segments in accordance with teachings disclosed herein, it is possible to treat the discrete segments as individual batches, thereby enabling the application of batch-like analytic techniques to produce predictive analytic information for continuous processes.

A framework for standard batch process control was adopted by the International Society of Automation (ISA) in 1995 as ISA-88. The ISA-88 standard defines the procedural control framework for a batch process in the context of a recipe that includes one or more unit procedures, which in turn may include an ordered sequence of operations, which may in turn include an ordered set of phases. Standard continuous process control systems are not subject to the ISA-88 standard and, therefore, are not typically defined in terms of procedural units, operations, and phases. However, in some examples disclosed herein, a virtual batch unit is generated for a continuous process system to run in parallel with the continuous process to provide predictive analytics on the process. That is, in some examples, the continuous process system is controlled using standard continuous process control techniques, while a virtual batch unit that mirrors the continuous process, but structured to mimic a typical batch process, is implemented in parallel to run a sampling batch of the continuous system (corresponding to a discrete temporal portion of the process as mentioned above) for purposes providing predictive analytics in a manner similar to batch analytics.

More particularly, in some examples, a dummy batch recipe may be defined to run successive ones of the sampling batches on the virtual batch unit, thereby mimicking a campaign of successive batches (consistent with ISA-88) while also mirroring the actual continuous process. The implementation of the virtual batch unit is able to mirror the actual continuous process control system because the virtual batch unit is defined to include input and output parameters corresponding to relevant inputs, outputs, and/or process parameters of the continuous process that are to be monitored and analyzed in connection with the individual sampling batches. Further, in some examples, the virtual batch unit is defined to include initial conditions (separate from the input parameters) that correspond to the value of the process parameters at the time a new sampling batch is initiated.

By breaking a continuous process into discrete portions that are implemented in connection with a virtual batch unit as defined above, the individual portions (e.g., sampling batches) may be analyzed using batch-like analytic techniques to provide fault detection and/or quality prediction for the current individual portion of the continuous process being analyzed. Further, by repeating the analysis for each successive sampling batch (e.g., discrete portion) defined in the continuous process, continual updates to the predictive analytics may be provided over the course of the entire continuous process.

In some examples, the duration of each sampling batch of a continuous process is set to a fixed period. In such examples, the analysis of the continuous process is performed without dynamic time warping (DTW) as is commonly implemented for traditional batch analytics. In some examples, the fixed period or duration defined for sampling batches corresponds to the residence time of the continuous process system. As used herein, the residence time (also known as retention time) of a process system refers to the duration for which material is processed in (e.g., resides in) the system. That is, the residence time corresponds to the duration between when particular material is initially introduced to the process as an input and when the particular material has been processed into the resulting output product. Often, the residence time of a continuous process control system is not constant for material introduced into the system at different points in time because of backflow and/or mixing of the material. Thus, the residence time may be represented as a distribution with some material remaining within the process system longer than other material. Accordingly, in some examples, the residence time used to define the length of individual sampling batches is approximated based on an average residence time for the continuous process system. In some examples, the duration of each sampling batch is equal to the approximation of the residence time. In other examples, the duration of each sampling batch may be greater than the residence time (e.g., up to 4 times the approximation of the residence time). Longer durations for the sampling batches may facilitate the capture of dynamic process behavior in the process control system. On the other hand, longer durations for the sampling batches leads to less frequent predictive analytic information.

As mentioned above, traditional batch analytics (based on PCA and PLS) cannot be directly applied to continuous steady state process systems because the process behavior is dynamic (e.g., deviations to the system and their corrections are time dependent). Examples disclosed herein account for dynamic (time-based) changes to process behavior in a continuous process system by using sampling batches (e.g., discrete portions) of historical process data of an associated continuous process as training data to develop an analytical model, where the historical sampling batches of the historical process data are selected to correspond to specific times when the process underwent dynamic changes. In standard batch analytics, an analytical model is generated based on training data corresponding to historical process data associated with a plurality of batches. That is, all the data from the beginning to the end of the training batches is used to generate a model. By contrast, only isolated portions of historical process data from a continuous process are used to define historical sampling batches used as the basis for generating an analytical model that may analyze a sampling batch being implemented in real-time. Furthermore, in some examples, the historical process data is used to define one historical sampling batch may overlap in time with the historical process data used to define a second historical sampling batch.

For example, assume a continuous process system is currently in a non-steady state such as during startup of the system. During startup there may be significant changes to the process parameters and/or the quality parameters (measured at the output) before the system reaches a steady state. Using a single historical sampling batch corresponding to historical process data associated with the entire startup period would not be able to account for the dynamic behavior occurring during the period. Accordingly, in some examples, multiple historical sampling batches may be extracted from the historical data corresponding to the startup period of a single continuous process with starting and ending times of each historical sampling batch slightly offset from one other. As a result, the different historical sampling batches cover overlapping time periods. In some examples, the temporal offset of successive ones of the historical sampling batches is defined to provide sufficient granularity to accurately capture the dynamic behavior of the process parameters and/or the quality parameters in the system. Thus, the amount of overlapping data between different historical sampling batches depends on the amount of dynamic behavior (e.g., volatility) in the process parameters and/or quality parameters at the points in time of interest. Typically, the startup period and the shutdown period of a continuous process exhibits greater dynamic behavior than during a steady state period. Accordingly, in some examples, historical sampling batches extracted from the historical process data of a continuous process are more densely overlapped around the startup and shutdown periods than the historical sampling batches extracted at times corresponding to the steady state period of the system. In some examples, the historical sampling batches corresponding the steady state period may not overlap at all. Further, although the above example is described with respect to historical data associated with a single continuous process having a single startup and a single shutdown, the historical sampling batches may be extracted from multiple similar continuous processes and/or during multiple startups and shutdowns and the associated steady states periods therebetween.

Typically, continuous process control systems operate in a steady state far more often than in a startup or shutdown period. Accordingly, in some examples, a greater number of historical sampling batches corresponding to the steady state period are used for model generation than historical sampling batches corresponding to startup or shutdown periods. However, a complete training set of historical sampling batches includes at least some sampling batches corresponding to the startup period, some batches corresponding to the steady state period, and some batches corresponding to the shutdown period. With the training set of historical sampling batches identified, an analytical model may be generated or trained based on the historical sampling batches in the same manner that traditional batch analytical models are generated from historical batch data. With an analytical model generated, real-time sampling batches corresponding to current continuous process may be analyzed to generate predictive analytic information indicative of fault detections and/or quality predictions of the output product of the process.

FIG. 1 is a schematic illustration of an example process control system 100 that may be implemented in accordance with teachings disclosed herein. In this example, the process control system 100 is implementing a continuous process. The example process control system 100 of FIG. 1 includes one or more process controllers (one of which is designated at reference numeral 102), one or more operator stations (one of which is designated at reference numeral 104), and one or more workstations (one of which is designated at reference numeral 106). The example process controller 102, the example operator station 104 and the example workstation 106 are communicatively coupled via a bus and/or local area network (LAN) 108, which is commonly referred to as an application control network (ACN).

The example operator station 104 of FIG. 1 allows an operator to review and/or operate one or more operator display screens and/or applications that enable the operator to view process control system parameters, states, conditions, alarms, etc., and/or change process control system settings (e.g., set points, operating states, etc.). The example operator station 104 includes and/or implements an example predictive analytics engine 105 to generate predictive analytics for the continuous process being implemented within the process control system 100. An example manner of implementing the example predictive analytics engine 105 of FIG. 1 is described below in connection with FIG. 2.

In some examples, the predictive analytics engine 105 executes a virtual batch unit associated with a dummy recipe outlining procedures for implementing a particular sampling batch of the continuous process. As described above and further below, the sampling batch is a discrete temporal portion of the continuous process that is implemented on the virtual batch unit for purposes of analysis independent of the actual control of the continuous process. In some examples, once a current sampling batch process ends, the predictive analytics engine 105 initiates a new sampling batch on the virtual batch unit, such that successive sampling batches form a chain or campaign of successive batches corresponding to and running parallel with the continuous process. During the execution of the virtual batch unit for each sampling batch, the predictive analytics engine 105 monitors process parameters and/or other inputs and outputs associated with the current sampling batch in substantially real-time. Further, the example predictive analytics engine 105 applies an analytical model to the current sampling batch in substantially real-time to detect faults and/or generate predictions about the quality of the output of the continuous process at period of time into the future corresponding to when the current sampling batch is to end. By performing this analysis on successive ones of the sampling batches, the predictive analytics engine 105 is able to provide substantially real-time fault detection and quality predictions for the continuous process in an ongoing manner. Such predictive analytic information can increase an operator's understanding of the current state of the process control system 100 and anticipated changes to the current state, thereby enabling the operator to respond more quickly and effectively to unexpected deviations in the process.

The example workstation 106 of FIG. 1 may be configured as an application station to perform one or more information technology applications, user-interactive applications and/or communication applications. For example, the application station 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the LAN 108 may be based on a hardwired and/or wireless Ethernet communication scheme. However, any other suitable communication medium(s) and/or protocol(s) could be used. Further, although a single LAN 108 is illustrated in FIG. 1, more than one LAN and/or other alternative communication hardware may be used to provide redundant communication paths between the example systems of FIG. 1.

The example controller 102 of FIG. 1 is coupled to a plurality of smart field devices 110, 112 and 114 via a digital data bus 116 and an input/output (I/O) gateway 118. The smart field devices 110, 112, and 114 may be Fieldbus compliant valves, actuators, sensors, etc., in which case the smart field devices 110, 112, and 114 communicate via the digital data bus 116 using the well-known Foundation Fieldbus protocol. Of course, other types of smart field devices and communication protocols could be used instead. For example, the smart field devices 110, 112, and 114 could instead be Profibus and/or HART compliant devices that communicate via the data bus 116 using the well-known Profibus and HART communication protocols. Additional I/O devices (similar and/or identical to the I/O gateway 118) may be coupled to the controller 102 to enable additional groups of smart field devices, which may be Foundation Fieldbus devices, HART devices, etc., to communicate with the controller 102.

In addition to the example smart field devices 110, 112, and 114, one or more non-smart field devices 120 and 122 may be communicatively coupled to the example controller 102. The example non-smart field devices 120 and 122 of FIG. 1 may be, for example, conventional 4-20 milliamp (mA) or 0-10 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102.

While FIG. 1 illustrates an example process control system 100 within which the methods and apparatus to perform predictive analytics on continuous process control systems described in greater detail below may be advantageously employed, persons of ordinary skill in the art will readily appreciate that the methods and apparatus to control information presented to operators and/or other personnel described herein may, if desired, be advantageously employed in other process plants and/or process control systems of greater or less complexity (e.g., having more than one controller, across more than one geographic location, etc.) than the illustrated example of FIG. 1.

Figure 2:
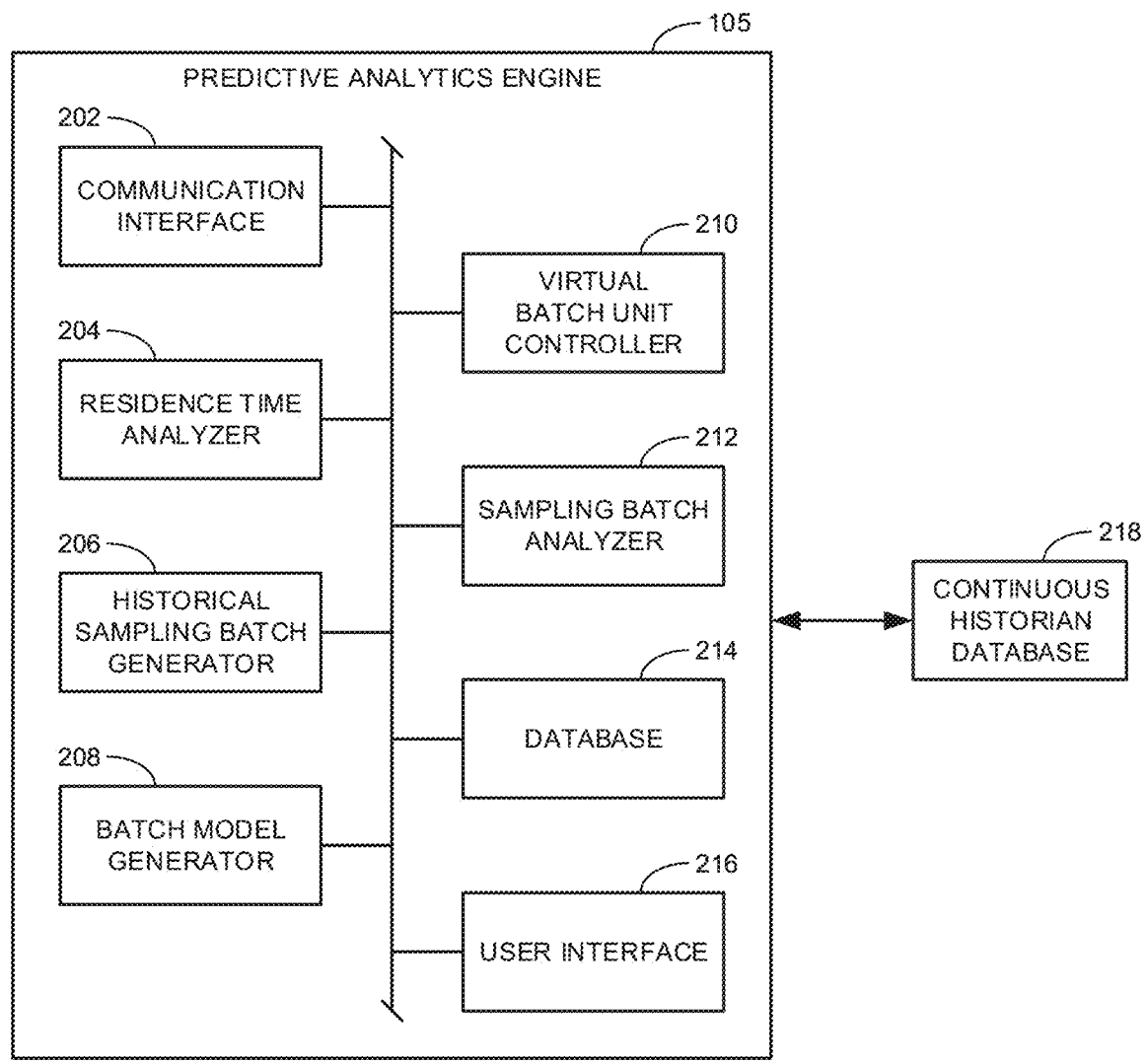
FIG. 2 illustrates an example manner of implementing the example predictive analytics engine of FIG. 1.

FIG. 2 illustrates an example manner of implementing the example predictive analytics engine 105 of FIG. 1. The example predictive analytics engine 105 of FIG. 2 includes an example communication interface 202, an example residence time analyzer 204, an example historical sampling batch generator 206, an example batch model generator 208, an example virtual batch unit controller 210, an example sampling batch analyzer 212, an example database 214, and an example user interface 216.

The example predictive analytics engine 105 of FIG. 2 includes the example communication interface 202 to communicate with other components within the example process control system 100. In some examples, the communication interface 202 receives process control data (indicative of the values of process parameters) in substantially real-time from the field devices 110, 112, 114, 120, 122 via the controller 102. In some examples, such process control data is sent to a continuous historian database 218 for storage. In some such examples, the communications interface 202 retrieves historical process data from the continuous historian database 218. In some examples, the continuous historian database 218 is implemented by the example database 214 of the predictive analytics engine 105. In other examples (as shown in the illustrated example), the continuous historian database 218 is implemented separate from the predictive analytics engine 105 and/or separate from the operator station 104.

The example predictive analytics engine 105 of FIG. 2 includes the example residence time analyzer 204 to analyze historical process data associated with a continuous control system process to approximate a residence time for the continuous process. As explained above, the residence time corresponds to the duration of time it takes for material to pass through or be processed by the continuous system. In some examples, the residence time analyzer 204 approximates the residence time based on a duration between when the continuous system first starts up and the earliest response of the system at the outlet as illustrated in FIG. 3.

Figure 3:
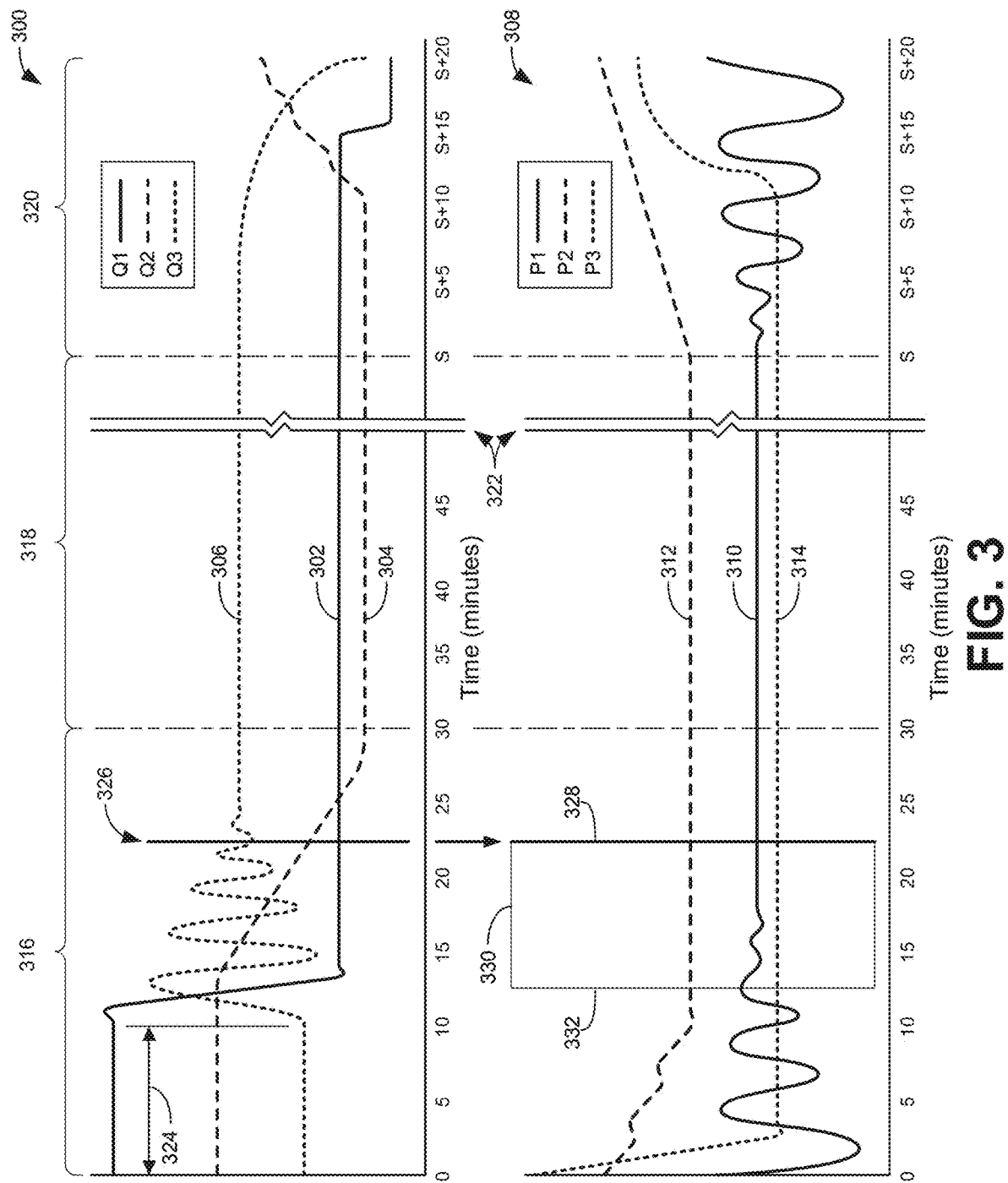
FIG. 3 includes graphs illustrating dynamic behavior of example quality parameters and process parameters of historical process data associated with an example continuous control system process.

FIG. 3 includes a first graph 300 representative of changes in quality parameters 302, 304, 306 at the outlet of an example continuous system over time and a second graph 308 representative of changes in process parameters and/or other input parameters 310, 312, 314 (collectively referred to herein as process parameters for the sake of brevity) of the continuous system over the same period of time. The quality parameters 302, 304, 306 may or may not correspond to the process parameters 310, 312, 314. Furthermore, while three quality parameters and three process parameters are shown for purposes of illustration, there may be any number of quality parameters and any number of process parameters.

In the illustrated example, the first and second graphs 300, 308 are temporally aligned with a common timescale to enable comparison of the quality parameters 302, 304, 306 and the process parameters 310, 312, 314 at any given point in time during the process. As shown in the illustrated example, a continuous control system process can be divided into three general phases or periods including a startup period 316, a steady state period 318, and a shutdown period 320. The steady state period 318 corresponds to when the continuous process has achieved a substantially stable state in which the process parameters 310, 312, 314 have reached and are being maintained at desired values (e.g., set point) and/or within acceptable thresholds of such values and the quality parameters 302, 304, 306 are similarly maintained in a substantially steady state (e.g., within acceptable thresholds of desired values). The startup and shutdown periods 316, 320, as their names imply, correspond to the period of time before the steady state period 318 when the process first begins and after the steady state period 318 when the process is being shut down.

For continuous control systems, the steady state period 318 may be significantly (e.g., orders of magnitude) longer period of time than either the startup period 316 or the shutdown period 320. Accordingly, in the illustrated example of FIG. 3, the graphs 300, 308 include a break 322 within the steady state period 318 to shorten the illustrated length of the period that may extend any duration up to time S. Based on the timescale shown in the illustrated example, the startup period 316 ends and the steady state period 318 begins around 30 minutes after the process first began. Although the process parameters 310, 312, 314 reach a steady state by 20 minutes, the steady state period 318 does not commence until 30 minutes because it takes that long for the second quality parameter 304 to reach a steady state. There is a lag in response of the quality parameters 302, 304, 306 relative to the process parameters 310, 312, 314 because the quality parameters are measured at the output side of the process, whereas the process parameters (at least inlet parameters) are measured at the input side of the process. This lag is the basis by which the example residence time analyzer 204 is able to approximate the residence time for the continuous process. More particular, in some examples, the residence time analyzer 204 determines an approximate residence time for the process based on a duration between when the continuous system first starts up (at time 0) and the earliest response of the system at the outlet. In the illustrated example of FIG. 3, the residence time (identified by reference numeral 324) is approximately 10 minutes because that is when the first and third quality parameters 302, 306 first begin to respond. In this example, the fact that the second quality parameter 304 does not begin to respond until several minutes later is irrelevant to the determination of the residence time 324. In some examples, the residence time may be determined based on the earliest response of a particular quality parameter regardless of whether other parameters may have responded before the particular parameter. For example, if the second quality parameters 304 is to be used, the residence time would be determined to be closer to 13 minutes as that is when the second quality parameter first begins to change in the illustrated example of FIG. 3. For purposes of explanation, the residence time of the illustrated example is assumed to be 10 minutes.

Returning to FIG. 2, the example predictive analytics engine 105 includes the historical sampling batch generator 206 to generate historical sampling batches used to generate or train an analytical model used to produce predictive analytic information for the continuous process. As used herein, a historical sampling batch includes the historical process data associated with a continuous control system process for a discrete period of time (e.g., a specified beginning and ending separated by a fixed duration). The historical process data corresponds to the process parameters of the control system as represented in the second graph 308 of FIG. 3. In some examples, the duration or length of the historical sampling batch is defined based on the approximation of the residence time 324 determined by the residence time analyzer 204. That is, in some examples, a historical sampling batch is defined with a duration corresponding to the residence time of the continuous process system.

In some examples, the historical sampling batch generator 206 determines the particular beginning and ending times for different historical sampling batches based on the values of the quality parameters (represented in the first graph 300 of FIG. 3) at particular points in time of interest. More particularly, as mentioned above, the quality parameters 302, 304, 306 are metrics of the quality of the output of the continuous process system. Accordingly, in some examples, the quality parameters at a particular point in time are identified to specify an ending time for a historical sampling batch. Furthermore, the values of the quality parameters at the particular quality reading point serve as the result or output of the associated historical sampling batch ending at the same point in time. The beginning of the historical sampling batch is determined by going back in time the fixed length of the historical sampling batch (corresponding to the residence time as described above). As a specific example, FIG. 3 shows a quality reading point 326 selected in the first graph 300 at approximately 22.5 minutes into the process. Following the arrow down to the second graph 308, the quality reading point 326 defines an ending time 328 of a historical sampling batch that includes historical process data (e.g., values of the process parameters 310, 312, 314) during the period outlined by the box 330. The duration (e.g., width) of the box 330 corresponds to the residence time 324 (e.g., 10 minutes in this example) thereby defining a beginning time 332 for the historical sampling batch at approximately 12.5 minutes into the continuous process. The example historical sampling batch generator 206 generates a historical sampling batch for the period of time identified by the box 330 by retrieving the historical process control data (e.g., the values of the process parameters 310, 312, 314) during the period demarcated by the box 330. The example historical sampling batch generator 206 further sets initial conditions for the historical sampling batch. In some examples, the initial conditions correspond to the values of the process parameters 310, 312, 314 at the beginning time 332 of the historical sampling batch.

In some examples, the number of historical sampling batches generated by the historical sampling batch generator 206 and their temporal spacing is based on the degree of dynamic changes in the historical process data and/or the quality parameters over time. For example, as shown in the first graph 300 of FIG. 3, the first quality parameter 302 drops precipitously soon after one residence time 324 (10 minutes) and reaches a steady state by 15 minutes into the process. Thus, there is a significant change in the dynamics of the first quality parameter 302 between 10 and 15 minutes of the process. The second quality parameter 304 also begins dropping soon after the first residence time 324, but the drop is more gradual and takes a longer period of time than for the first quality parameter 302. The third quality parameter 306 also begins changing around 10 minutes (one residence time) and fluctuates significantly for a period of time before reaching a steady state around 25 minutes into the process. The relatively gradual slope of the second quality parameter 304 results in the second quality parameter 304 taking longer to arrive at a steady state than either the first or third quality parameters 302, 306.

To properly capture the relatively high degree of dynamic change in the first and third quality parameters 302, 306 during the startup period 316, the example historical sampling batch generator 206 may select or identify multiple quality reading points that are spaced at relatively small time intervals. After 25 minutes into the example process represented by the graphs 300, 308 in FIG. 3, when the first and third quality parameters 302, 306 have reached a steady state, the example historical sampling batch generator 206 may select or identify additional quality reading points that are spaced at larger intervals because the degree of dynamic change in the second quality parameter 304 is smaller. After all three quality parameters 302, 304, 306 have reached a steady state (e.g., when the process enters the steady state period 318), the intervals between quality reading points may be spaced farther apart. This is demonstrated graphically in the illustrated example of FIG. 4, which contains an enlarged portion of the graphs 300, 308 of FIG. 3.

Figure 4:
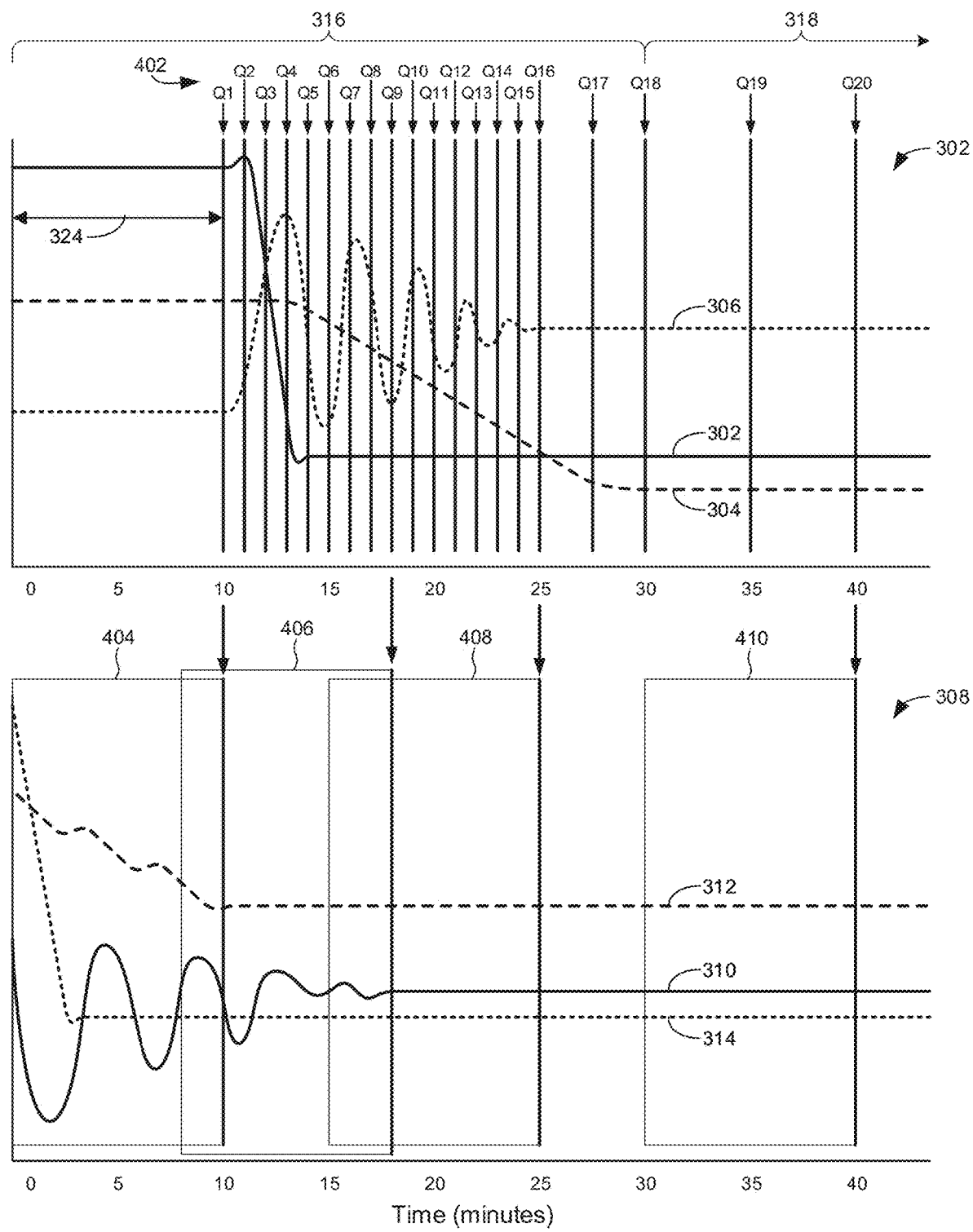
FIG. 4 is an enlarged view of the example graphs of FIG. 3.

In the illustrated example of FIG. 4, twenty different quality reading points 402 are identified and respectively labelled from Q1 to Q20. As shown in FIG. 4, the first quality reading point 402 (Q1) is located at the 10 minute mark corresponding to one residence time 324. The first quality reading point 402 (Q1) is set at one residence time to enable a first portion of historical process control data (identified by the box 404) to define a complete historical sampling batch having the fixed length corresponding to the residence time 324 as described above and shown in the illustrated example. In the illustrated example, the next fifteen quality reading points 402 (Q2-Q16) are spaced apart by a relatively small interval to capture the dynamic changes in the quality parameters 302, 304, 306 from the 10 minute mark up to the 25 minute mark (when the third quality parameter 306 reaches a steady state). For purposes of clarity, the first through sixteenth quality reading points 402 (Q1-Q16) are spaced at an interval of one minute. However, in some examples, due to the relatively high degree of dynamic changes in the quality parameters in this time period, the temporal spacing of the quality reading points 402 may be significantly less (e.g., 1 second, 5, seconds, 10 seconds, 15 seconds, etc.). Alternatively, where there is less dynamic change in the quality parameters, the temporal spacing of the quality reading points 402 may be increased. For example, as mentioned above, the slope of the second quality parameter 304 is more gradual than the changes in the first and third quality parameters 302, 306. As a result, in the illustrated examples, the quality reading points 402 beginning at 25 minutes (Q16) and extending to the end of the startup period 316 at 30 minutes (Q18) are set at an interval of 2.5 minutes. After entering the steady state period 318, the quality reading points 402 are spaced farther apart (e.g., every five minutes in the illustrated example) because there are substantially no dynamic changes to the quality parameters 302, 304, 306.

Although the temporal spacing of the quality reading points 402 have been described as being based on the dynamic changes to the quality parameters 302, 304, 306, in some examples, the temporal spacing may additionally or alternatively be based on the dynamic changes to the process parameters 310, 312, 314. More particularly, in some examples, the temporal spacing of the quality reading points 402 is based on whichever parameter exhibits the greatest degree of dynamic change at the relevant point in time. Further, although the temporal spacing of the quality reading points 402 is shown at relatively fixed intervals, in some examples, the different quality reading points 402 may be located at irregular intervals suitable to the variability in the parameters at the corresponding point in time. In some examples, the timing of the quality reading points 402 is randomly selected within suitable ranges of the full duration of the continuous process. For instance, in some examples, the historical sampling batch generator 206 may determine a suitable number of quality reading points needed to adequately capture the dynamic behavior of the parameters in the startup period 316 and then randomly identify particular times within the startup period 316 (beginning at one residence time) for the identified number of quality reading points. This random selection process may be repeated for the steady state period 318 and the shutdown period 320.

As shown in the illustrated example of FIG. 4, although the temporal spacing between adjacent ones of the quality reading points 402 varies depending on the degree of dynamic change associated with the quality parameters 302, 304, 306, the intervals between the quality reading points 402 are smaller than the residence time 324. As a result, different ones of the historical sampling batches generated for the different quality reading points 402 contain overlapping portions of the historical process data. For example, as mentioned above the first portion of historical process data 404 corresponds to the values of the process parameters from time 0 to 10 minutes. A second portion of historical process data 406 is shown in the illustrated example corresponding to the ninth quality reading point 402 (Q9) set at 18 minutes into the process. As the quality reading points 402 define the ending time for associated historical sampling batches, the beginning time is determined by going back in time by the residence time 324 (10 minutes in this example). Thus, the beginning of the second portion of historical process data 406 in the illustrated example is at 8 minutes into the process, thereby resulting in a two minute overlap with the first portion of historical process data 404. A third portion of historical process data 408 is shown extending from 15 minutes to 25 minutes into the process, thereby resulting in a three minute overlap with the second portion of historical process data 406. A fourth portion of historical process data 410 is shown extending from 30 minutes to 40 minutes into the process, such that there is no overlap with the first three portions of historical process data shown in FIG. 4. However, additional portions of historical process data retrieved during the respective periods of time associated with the other quality reading points 402 would result in each portion of historical process data overlapping with at least one other portion of data. Although the portions of historical process data overlap, the time shift or temporal spacing between adjacent ones of the portions of data result in different values for the quality parameters and process parameters at the corresponding quality reading point 402 as well as differences in the process parameters at the beginning of each portion of data (which serve as the initial conditions for each associated historical sampling batch).

In some examples, where there is substantially no dynamic change in the quality parameters and/or the process parameters for a period of time corresponding to the residence time 324 (e.g., during the steady state period 318), the temporal spacing of the quality reading points 402 may be equal to or greater than residence time. In such situations, the portions of historical process data for different ones of the corresponding historical sampling batches will not overlap because, as described above, the duration of the historical sampling batches generated based on the portions of historical process data is equal to the residence time. Although the above examples have been described with the historical sampling batches assumed to have a duration corresponding to the residence time, in other examples, the historical sampling batches may be defined with a duration that is greater than the residence time (e.g., twice the residence time, three time the residence time, etc.).

Although the above discussion of FIG. 4 is limited to the selection of quality reading points 402 in the startup period 316 and the steady state period 318, a similar approach may be taken to identify portions of data for additional historical sampling batches associated with the shutdown period 320 shown in FIG. 3. That is, the timing and spacing of additional quality reading points 402 may be selected within the shutdown period 320 based on the degree of dynamic changes to the quality parameters 302, 304, 306 and/or the process parameters 310, 312, 314.

The example historical sampling batch generator 206 may generate any suitable number of batches associated with each of the startup period 316, the steady state period 318, and the shutdown period 320. In some examples, the number of historical sampling batches associated with the steady state period 318 will be greater than the number of historical sampling batches associated with the startup and shutdown periods 316, 320. For instance, in some examples, approximately 50% of all historical sampling batches generated by the historical sampling batch generator 206 are associated with the steady state period 318 and 25% of all historical sampling batches are associated with each of the startup and shutdown periods 316, 320. In some examples, the historical sampling batches associated with the startup period 316 are retrieved from historical process data corresponding to a single startup event. In other examples, the historical sampling batches associated with the startup period 316 may be retrieved from multiple different instances of the continuous process system starting up. Similarly, the historical sampling batches associated with the steady state and shutdown periods 318, 320 may all be retrieved from a single operation of the continuous process or from multiple different operations spaced apart by multiple shutdowns and subsequent startups. In some examples, the historical sampling batches generated by the historical sampling batch generator 206 are stored in the example database 214 for subsequent use.

In the illustrated example of FIG. 2, the predictive analytics engine 105 includes the batch model generator 208 to generate an analytical model that may be used to analyze real-time sampling batches associated with a continuous control system process operating in real-time. In some examples, the analytical model is developed using the historical sampling batches generated by the example historical sampling batch generator 206. More particularly, in some examples, the batch model generator 208 generates the analytical model using multi-variate data analysis on a pool of the historical sampling batches. The pool may include any suitable number of historical sampling batches to provide statistically reliable results (e.g., at least 25 batches). In some examples, the pool may be divided into two sets of batches; the first for model training and the second for cross-validation. In some examples, all of the historical sampling batches generated by the historical sampling batch generator 206 are included in the pool. In other examples, a subset of all the historical sampling batches are selected for inclusion in the pool. In some examples, the historical sampling batches are selected and/or generated so that the pool includes more historical sampling batches associated with the steady state period 318 than with either the startup period 316 or the shutdown period 320. In some examples, the numbers of historical sampling batches associated with both the startup and shutdown periods 316, 320 are approximately equal while the number of historical sampling batches associated with steady state period 318 is approximately twice as many as the historical sampling batches associated with the startup and shutdown periods 316, 320.

In some examples, the batch model generator 208 corresponds to (or at least operates similar to) existing analytics software, firmware, and/or hardware used to generate models for traditional batch processes. That is, in some examples, the batch model generator 208 generates an analytical model based on the historical sampling batches using PCA and/or PLS techniques. As mentioned above, PCA and PLS cannot be applied directly to a continuous process because continuous processes involve dynamic behavior over time that cannot be accounted for by PCA and PLS. However, examples described herein overcome this difficulty by generating multiple fixed-length snapshots of discrete portions of the continuous process corresponding to the historical sampling batches described above. Further, the dynamic behavior of parameters associated with the continuous process are taken into account based on the different historical sampling batches that have different beginning and ending times temporally spaced at a granularity suitable to capture the changes in the parameters of the continuous process over time. That is, rather than analyzing a number of batches that have the same beginning and same ending to generate an analytical model (as is done in traditional batch analytics), the analysis in the disclosed examples is associated with multiple sampling batches that are slightly time-shifted relative to one another over the course of relevant periods of a continuous process of interest. In some examples, the analytical model generated by the batch model generator 208 is stored in the example database 214 for subsequent use.

Figure 5:
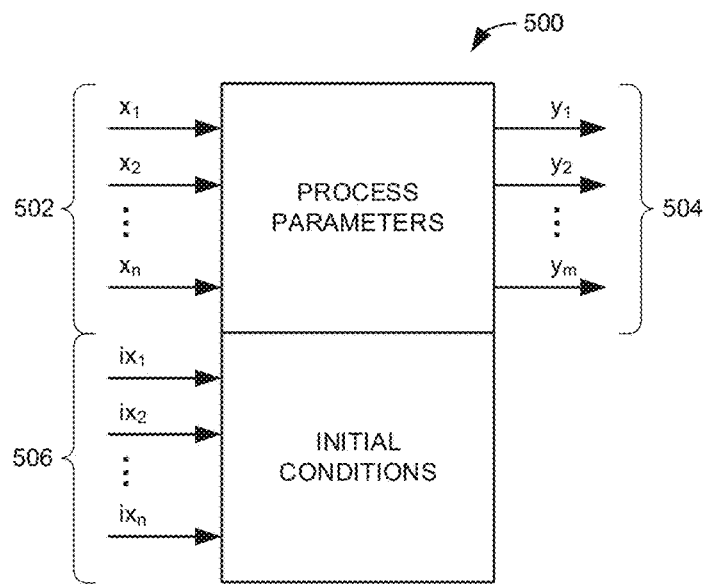
FIG. 5 is a schematic of an example virtual batch unit implemented in accordance with teachings disclosed herein.

The example predictive analytics engine 105 of FIG. 2 includes the example virtual batch unit controller 210 to generate a virtual batch unit that serves as the basis for the virtual batch unit controller 210 to implement a sampling batch in real-time corresponding to the real-time operation of a continuous process. In some examples, the virtual batch unit controller 210 corresponds to (or at least operates similar to) existing batch control software, firmware, and/or hardware used to control a standard batch process (e.g., Batch Executive in DeltaV™). According to the ISA-88 standard for traditional batch process control, batches are defined in the context of a recipe that includes at least one unit procedure defining the procedural controls associated with operation of equipment in a physical process control unit. Consistent with this standard, the virtual batch unit controller 210 of the illustrated example defines a virtual batch unit to stand in the place of a physical unit defined for standard batch processes. As used herein, a virtual batch unit refers to a data structure that defines or includes all relevant parameters (e.g., process parameters and/or inputs and quality parameters and/or outputs) of a continuous control system process to be able to implement a sampling batch in a manner that is consistent with ISA-88 so that batch-like analytic techniques may be applied to the sampling batch. A schematic of an example virtual batch unit 500 is shown in FIG. 5. Similar to standard batch units and associated unit procedures, the example virtual batch unit 500 includes input parameters 502 that are monitored in substantially real-time and output parameters 504 used to measure and/or indicate the quality of an output of the process. In some examples, the input parameters 502 correspond to the process parameters associated with a continuous process control system such as, for example, the process parameters 310, 312, 314 shown and described in connection with FIGS. 3 and/or 4. Further, in some examples, the output parameters 504 correspond to the quality parameters associated with the continuous process control system such as, for example, the quality parameters 302, 304, 306 shown and described in connection with FIGS. 3 and/or 4.

Unlike standard batch units and associated unit procedures, the example virtual batch unit 500 includes a separate set of inputs referred to herein as initial conditions 506. Traditional batch processes do not have to specifically define initial conditions for the same set of process parameters because the beginning of a batch process is about the same every time as far as these parameters are concerned. By contrast, as discussed further below, different sampling batches implemented on the virtual batch unit 500 start at different points of time within a single continuous batch process. As a result, the values of process parameters at the beginning point of any particular sampling batch are not necessarily the same as the values at the beginning point of a different sampling batch. Accordingly, the example virtual batch unit 500 includes the initial conditions 506 that are defined as the values of the process parameters (e.g., the process parameters 310, 312, 314 of FIGS. 3 and/or 4) at the beginning time of the current sampling batch. That is, the virtual batch unit 500 includes duplicate sets of the process parameters as inputs. However, whereas the input parameters 502 are updated in substantially real-time as the associated continuous process advances, the initial conditions 506 are fixed values defined at the time when the sampling batch is first initiated. Although fixed throughout the implementation of a single sampling batch, the initial conditions 506 may be reset with new values each time a new sampling batch is initiated.

In some examples, the virtual batch unit controller 210 implements a sampling batch on the virtual batch unit 500 in substantially real-time in parallel with the operation of a continuous process. The sampling batch corresponds to values of the process parameters currently existing in the continuous process. The purpose of implementing the sampling batch by the virtual batch unit controller 210 using a virtual batch unit is to enable the use of batch-like analytic techniques for a continuous process. That is, the implementation of the sampling batch on a virtual batch unit does not directly impact or control the operation of the continuous process but runs in parallel with the control and operation of the continuous process to provide predictive analytics. As a result, the recipe used in connection with the virtual batch unit 500 is referred to herein as a dummy recipe because the recipe does not actually control operation of the system. However, in some examples, the results of the predictive analytic information produced by analyzing a sampling batch run on the virtual batch unit 500 may be used to adjust or adapt the process being controlled through standard continuous process control techniques.

Each individual sampling batch implemented by the virtual batch unit controller 210 is defined to have the same duration as the historical sampling batches used to generate the analytical model used to generate the predictive analytics. Further, the real-time sampling batches implemented by the virtual batch unit controller 210 are implemented back-to-back in a contiguous manner. That is, the ending of one sampling batch corresponds to the beginning of the next subsequent sampling batch with a new sampling batch being initiated each time the current sampling batch ends throughout the duration of the associated continuous process to be analyzed. In other words, the continuous process is treated as a campaign of many successive batches being run on the virtual batch unit 500.

Figure 6:
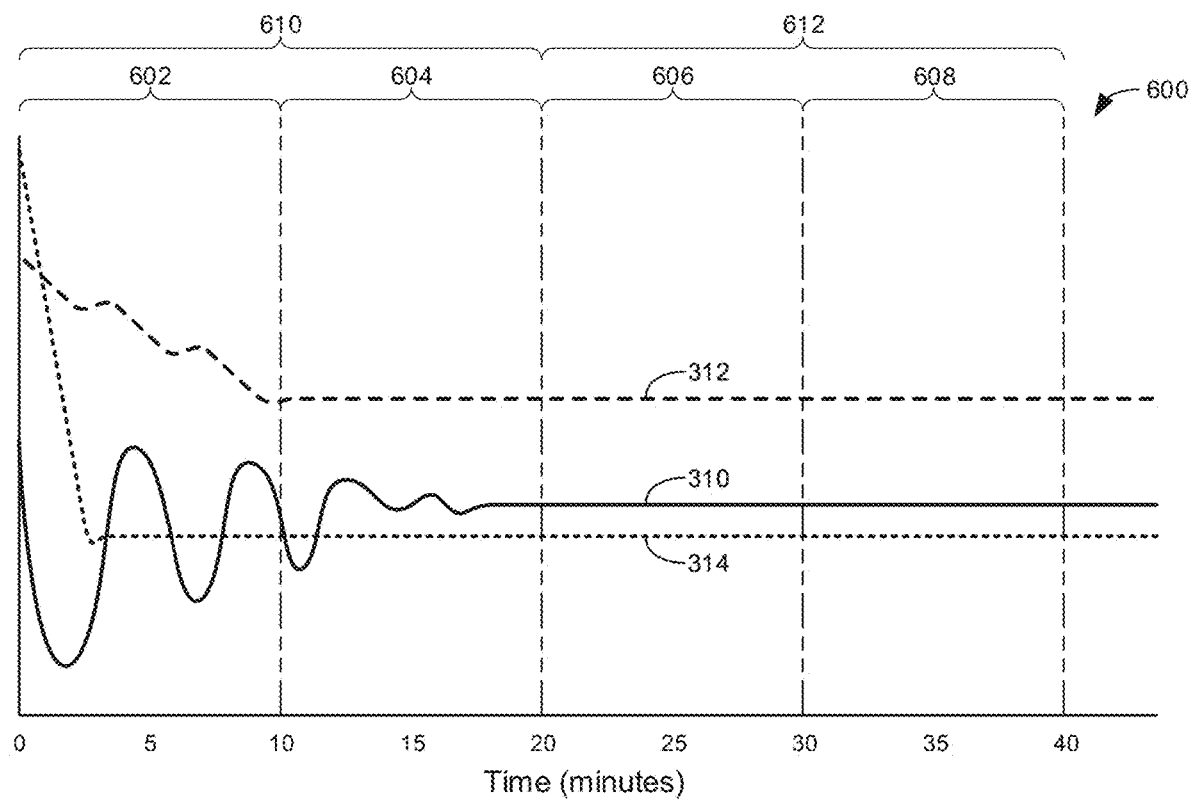
FIG. 6 is a graph illustrating dynamic behavior of example process parameters of an example continuous control system process while in operation.

For example, FIG. 6 is a graph 600 illustrating the process parameters 310, 312, 314 of a continuous process operating in real-time. In the illustrated example, a first sampling batch begins at the same time the continuous process begins (time 0) and extends for a first time period 602 corresponding to the length of the historical sampling batches described above in connection with FIGS. 3 and 4. As described above, the historical sampling batches may be defined to have a length corresponding to the residence time of the continuous process (e.g., ten minutes in the illustrated examples). As described above, the initial conditions 506 defined for the virtual batch unit 500 when implementing this first sampling batch (during the first time period 602) correspond to the initial values of the process parameters 310, 314, 312 (e.g., at time 0). At the ten minute mark, the first sampling batch ends and a second sampling batch is initiated on the virtual batch unit 500 during a second time period 604. At the transition between the first and second time periods 602, 604 (associated with the transition from a first sampling batch to a second sampling batch), the initial conditions 506 for the virtual batch unit 500 are reset to correspond to the values of the process parameters at the beginning of the second time period 604 (e.g., at 10 minutes into the process). The process of initiating subsequent sampling batches at subsequent time periods 606, 608 corresponds to successive ten minute increments of time and resetting the initial conditions for the virtual batch unit 500 for each new sampling batch effectively enables the continuous process to be treated as a series or campaign of individual batch process.

The examples discussed herein have primarily been focused on the scenario where the sampling batches are defined to have a duration corresponding to the residence time of the continuous process (e.g., 10 minutes in the illustrated examples). However, as mentioned above, in some examples, the duration of the sampling batches may be longer than the residence time. More particularly, in some examples, the duration of a single sampling batch may be a multiple of the residence time (e.g., two residence times, three residence times, four residence times, etc.). In some such examples, the sampling batches associated with a single procedural unit (e.g., the virtual batch unit 500) may be divided into multiple stages having a duration of a single residence time. That is, rather than treating the first and second time periods 602, 604 in FIG. 6 as corresponding to separate sampling batches, in some examples, the first and second time periods 602, 604 may correspond to separate stages associated with a single sampling batch that extends a first extended time period 610. In this example, a second extended time period 612 defines the duration of a second sampling batch with the third and fourth time periods 606, 608 corresponding to separate stages within the second sampling batch. In some examples, the duration of a sampling batch and/or stages within the sampling batch may not correspond to a multiple of the residence time but may be any suitable length depending on the degree of dynamic changes in the process and/or quality parameters and the level of accuracy of the predictive analytics to be generated.

The example predictive analytics engine 105 of FIG. 2 includes the example sampling batch analyzer 212 to analyze a sampling batch currently being implemented by the virtual batch unit controller 210 on the virtual batch unit 500 using the analytical model generated by the batch model generator 208. In some examples, the sampling batch analyzer 212 corresponds to (or at least operates similar to) existing batch analytics software, firmware, and/or hardware used to analyze a standard batch based on a corresponding analytical model for the batch process. In examples where the sampling batch analyzer 212 corresponds to existing batch analytics software, firmware, and/or hardware, the dynamic time warping functionality implemented for standard batch analytics may be disabled as unnecessary because, as described above, the sampling batch being analyzed and all the historical sampling batches used to generate the analytical model are defined to have the same duration.

In some examples, the results output by the sampling batch analyzer 212 provide fault detection and/or quality prediction information (collectively referred to as predictive analytic information) associated with the current sampling batch for the duration of the sampling batch. When a new sampling process is initiated, the sampling batch analyzer 212 analyzes the new sampling batch to generate predictive analytic information for the new sampling batch. Thus, the period of time into the future for which quality predictions are provided (e.g., the prediction horizon) corresponds to the duration of the sampling batches. Thus, when a new sampling batch is initiated in the above examples with the residence time of 10 minutes, the predictive analytic information provides a prediction of the quality of output of the continuous process 10 minutes into the future. As time progresses through the current sampling batch, the distance into the future represented by the predictive analytic information decreases until time reaches the end of the current sampling batch. Thereafter, a new sampling batch is initiated, and a new prediction 10 minutes into the future may be generated.

In some examples, the predictive analytic information provided by the example sampling batch analyzer 212 is stored in the database 214. Additionally or alternatively, the example communications interface 202 may transmit the predictive analytic information to the continuous historian database 218. Further, in some examples, the user interface 216 generates and/or renders graphical representations of the predictive analytic information via an associated display screen. In some examples, the graphical representation of the predictive analytic information may be similar to that which is provided for standard batch process analytics. However, in some examples, the predictive analytic information for successive sampling batches may be appended to one another to provide a continual timeline of the predictions throughout the duration of the continuous control system process being monitored.

Figure 7:
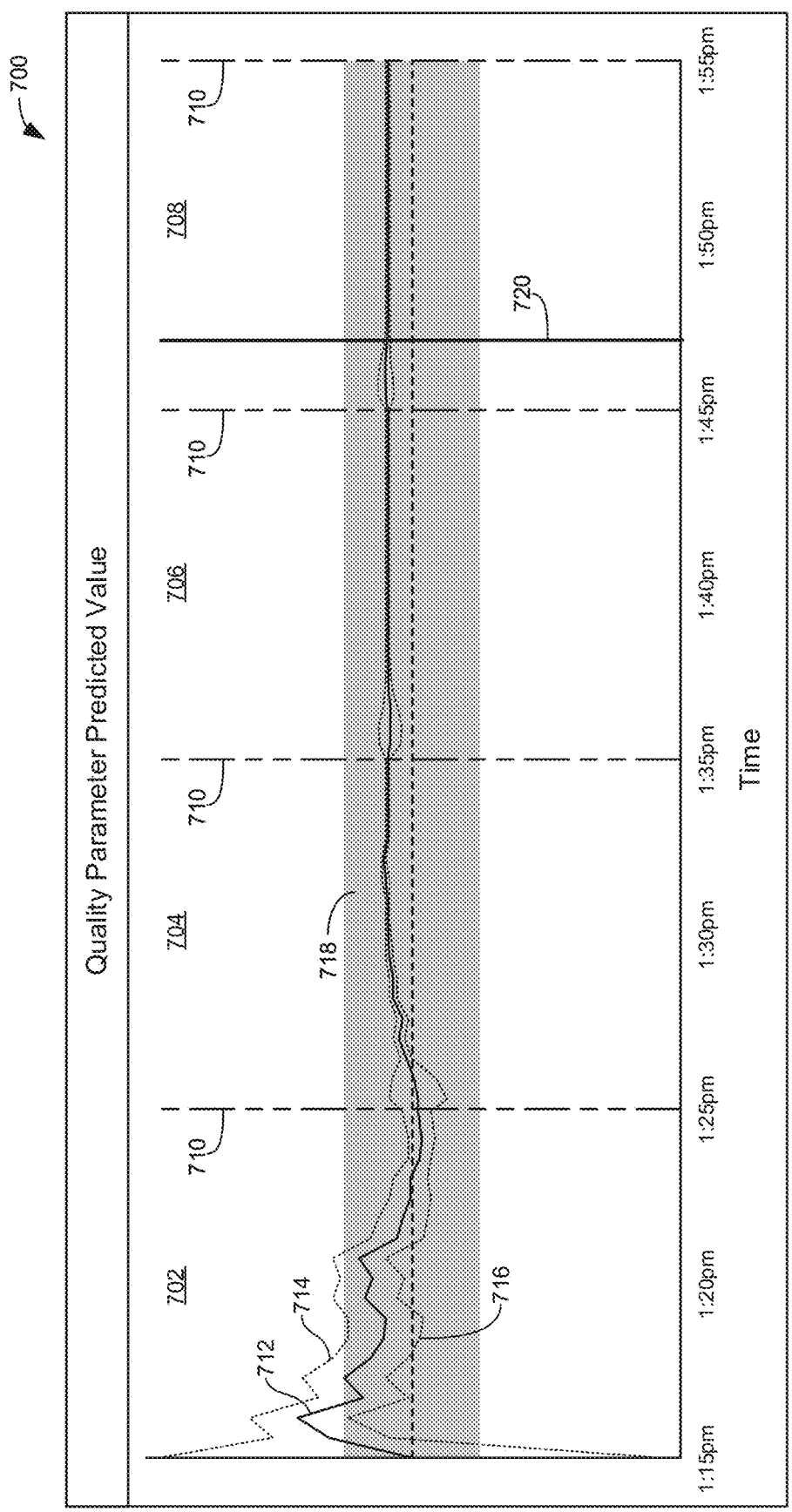
FIG. 7 is an example quality prediction interface that may be rendered in accordance with teachings disclosed herein.

For example, FIG. 7 illustrates an example quality prediction interface 700 that provides predictive analytic information for a particular quality parameter (e.g., one of the quality parameters 302, 304, 306 of FIG. 3) during four consecutive time periods 702, 704, 706, 708 associated with four successive sampling batches. In some examples, the beginning and ending of the separate sampling batches may be identified by sampling batch lines 710. In this example, the first time period 702 corresponds to the initial startup of a process. As a result, there is significant variability in the prediction for the quality parameter indicated by the central solid line 712 and relatively low confidence in the prediction as indicated by the relatively wide confidence range indicated by the upper and lower dashed lines 714, 716. However, as time advances and the process approaches a steady state, the prediction for the quality parameter also converges to a substantially steady state that is within a shaded area 718 defining the boundaries of the quality parameter that satisfy the specifications of the output of the process. In some examples, a current time indicator 720 (e.g., a line) indicates the current time. In this example, the current time is 1:47 pm, which is two minutes into the fourth time period 708 corresponding to the fourth sampling batch. As shown in the illustrated examples, the prediction for the quality parameter (e.g., the solid line 712) extends beyond the current time 720 to 1:55 pm corresponding to the ending time of the current sampling batch. Thus, an operator has a prediction of the quality of the output of the continuous process that extends eight minutes into the future from the current time 720. In some examples, once the current time reaches the end of the fourth time period 708, the graph in the quality prediction interface 700 may shift to represent predictions associated with a new sampling batch.

Returning to FIG. 2, the example user interface 216 also enables a user to configure and/or adjust the operation of the components of the predictive analytics engine 105. For instance, in some examples, a user may use the user interface 216 to adjust or specify the residence time and/or specify whether the lengths of sampling batches correspond to the residence time or a duration that is greater than the residence time. In some examples, a user may specify, via the user interface 216, the number of historical sampling batches to be generated by the historical sampling batch generator 206 and/or the temporal spacing of the quality reading points 402 used to define the temporal positions of the different historical sampling batches. In some examples, a user may specify, via the user interface 216, the number of historical sampling batches used by the batch model generator 208 to generate an analytical model. In some examples, a user may specify, via the user interface 216, the proportion of historical sampling batches taken from each of the startup period 316, the steady state period 318, and the shutdown period 320. In some examples, a user may specify, via the user interface 216, the continuous process parameters associated with the continuous process that are to serve as input parameters and output parameters for a virtual batch unit 500.

While an example manner of implementing the predictive analytics engine 105 of FIG. 1 is illustrated in FIG. 2, one or more of the elements, processes and/or devices illustrated in FIG. 2 may be combined, divided, re-arranged, omitted, eliminated and/or implemented in any other way. Further, the example communication interface 202, the example residence time analyzer 204, the example historical sampling batch generator 206, the example batch model generator 208, the example virtual batch unit controller 210, the example sampling batch analyzer 212, the example database 214, the example user interface 216, and/or, more generally, the example predictive analytics engine 105 of FIG. 1 may be implemented by hardware, software, firmware and/or any combination of hardware, software and/or firmware. Thus, for example, any of the example communication interface 202, the example residence time analyzer 204, the example historical sampling batch generator 206, the example batch model generator 208, the example virtual batch unit controller 210, the example sampling batch analyzer 212, the example database 214, the example user interface 216 and/or, more generally, the example predictive analytics engine 105 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 202, the example residence time analyzer 204, the example historical sampling batch generator 206, the example batch model generator 208, the example virtual batch unit controller 210, the example sampling batch analyzer 212, the example database 214, and/or the example user interface 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example predictive analytics engine 105 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
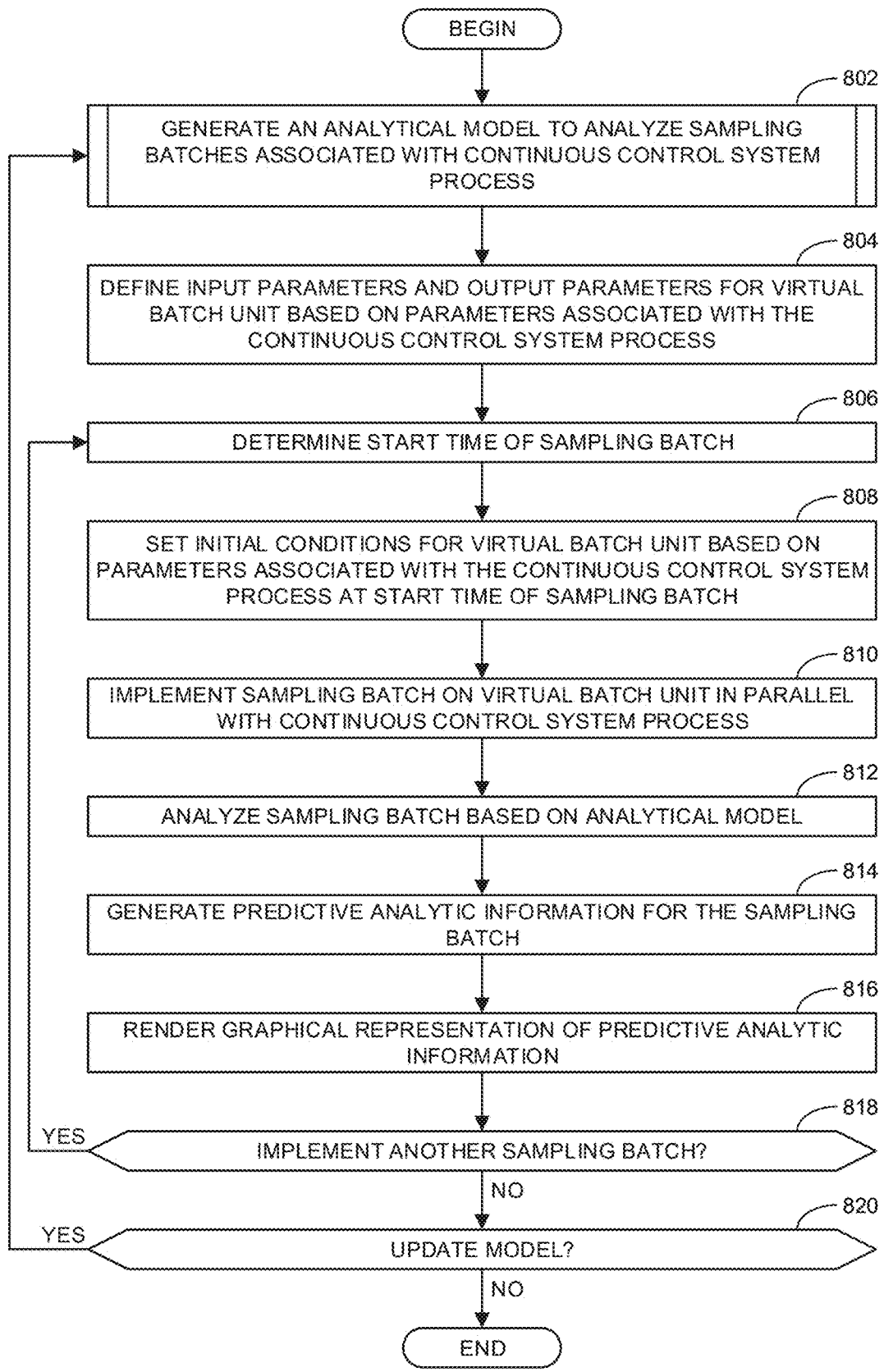
FIGS. 8-10 are flowcharts representative of example methods that may be carried out to implement the example predictive analytics engine of FIGS. 1 and/or 2.
Figure 9:
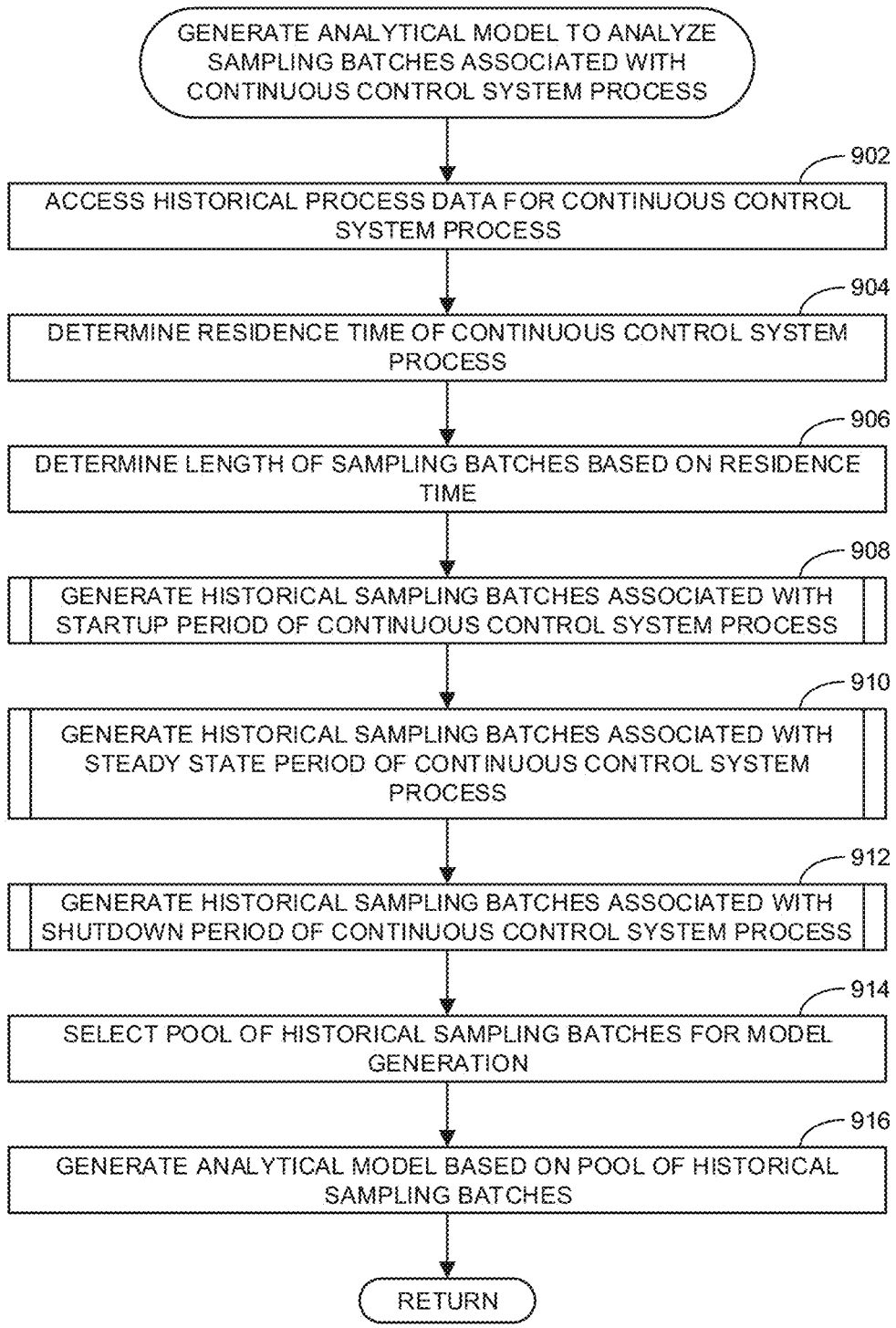
Figure 10:
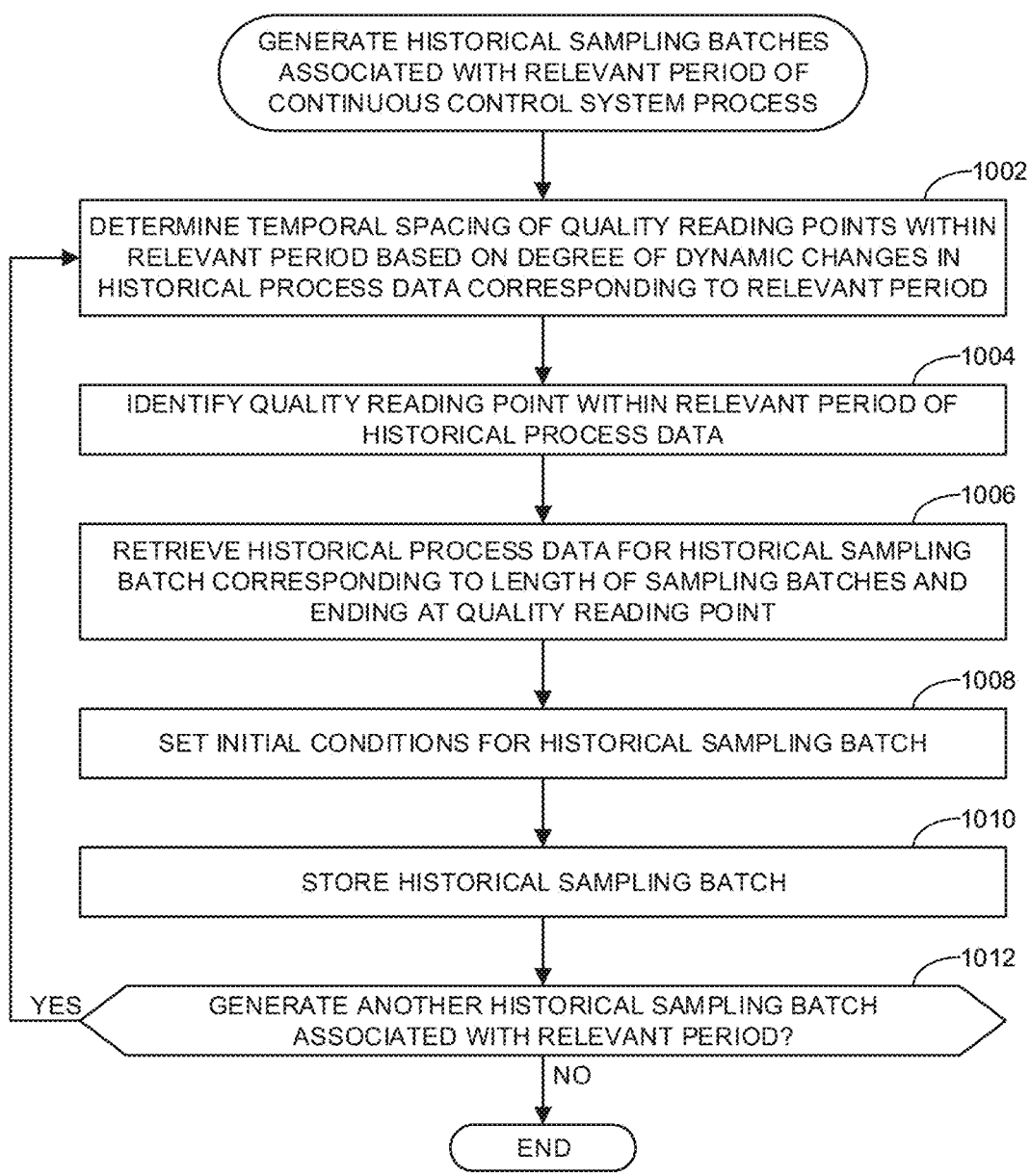

A flowchart representative of example hardware logic, machine readable instructions, hardware implemented state machines, and/or any combination thereof for implementing the predictive analytics engine 105 of FIGS. 1 and/or 2 is shown in FIG. 8-10. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 8-10, many other methods of implementing the example predictive analytics engine 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 8-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example process of FIG. 8 begins at block 802 where the example predictive analytics engine 105 generates an analytical model to analyze sampling batches associated with a continuous control system process. Further detail regarding the implementation of block 802 is provided below in connection with FIGS. 9 and 10. At block 804, the example virtual batch unit controller 210 defines input parameters and output parameters for a virtual batch unit (e.g., the virtual batch unit 500 of FIG. 5) based on parameters associated with the continuous control system process (e.g., the quality parameters 302, 304, 306 and the process parameters 310, 312, 314 of FIGS. 3 and/or 4). At block 806, the example virtual batch unit controller 210 determines a start time of a sampling batch. The start time of the sampling batch may correspond to the start time of the continuous control system process or the ending time of a previous sampling batch. The ending time of a current sampling batch is defined based on the fixed duration set for the sampling batches. In some examples, the historical sampling batch generator 206 and/or the virtual batch unit controller 210 determine the duration of sampling batches based on a residence time of the continuous control system process. At block 808, the example virtual batch unit controller 210 sets initial conditions for the virtual batch unit based on the parameters associated with the continuous control system process at the start time of the sampling batch.

At block 810, the example virtual batch unit controller 210 implements a sampling batch on the virtual batch unit 500 in parallel with the continuous control system process. At block 812, the example sampling batch analyzer 212 analyzes the sampling batch based on the analytical model. At block 814, the example sampling batch analyzer 212 generates predictive analytic information for the sampling batch. The predictive analytic information may be indicative of fault detection and/or quality prediction for the continuous control system process. At block 816, the example user interface 216 renders a graphical representation of the predictive analytic information.

At block 818, the example virtual batch unit controller 210 determines whether to implement another sampling batch. If so, control returns to block 806. Otherwise, control advances to block 820 where the predictive analytics engine 105 determines whether to update the analytical model. If so, control returns to block 802. Otherwise, the example process of FIG. 8 ends.

FIG. 9 is a flowchart representative of an example implementation of block 802 of FIG. 8. The example process of FIG. 9 begins at block 902 where the communications interface 202 accesses historical process data for the continuous control system process. At block 904, the example residence time analyzer 204 determines residence time of the continuous control system process. At block 906, the example historical sampling batch generator 206 and/or the example virtual batch unit controller 210 determines the length of sampling batches based on the residence time. At block 908, the example historical sampling batch generator 206 generates historical sampling batches associated with a startup period (e.g., the startup period 316) of the continuous control system process. At block 910, the example historical sampling batch generator 206 generates historical sampling batches associated with a steady state period (e.g., the steady state period 318) of the continuous control system process. At block 912, the example historical sampling batch generator 206 generates historical sampling batches associated with a shutdown period (e.g., the shutdown period 320) of the continuous control system process. Further detail regarding the implementation of blocks 908, 910, and 912 are provided below in connection with FIG. 10. At block 914, the example batch model generator 208 selects a pool of the historical sampling batches for model generation. At block 916, the example batch model generator 208 generates the analytical model based on the pool of historical sampling batches. Thereafter, the process of FIG. 9 ends and returns to complete the process of FIG. 8.

FIG. 10 is a flowchart representative of an example implementation of any one of blocks 908, 910, and 912 of FIG. 9. The example process of FIG. 10 begins at block 1002 where the example historical sampling batch generator 206 determines a temporal spacing of quality reading points (e.g. the quality reading points 402 of FIG. 4) within the relevant period based on a degree of dynamic changes in the historical process data corresponding to the relevant period. In this context, the relevant period corresponds to the startup period 316 when implementing block 908 of FIG. 9, the steady state period 318 when implementing block 910 of FIG. 9, and the shutdown period 320 when implementing block 912 of FIG. 9. At block 1004, the example historical sampling batch generator 206 identifies a quality reading point 402 within the relevant period of the historical process data. At block 1006, the example communications interface 202 retrieves the historical process data for a historical sampling batch corresponding to the length of sampling batches (determined at block 906 of FIG. 9) and ending at the quality reading point. At block 1008, the example historical sampling batch generator 206 sets initial conditions for the historical sampling batch. At block 1010, the example database 214 stores the historical sampling batch. At block 1012, the example historical sampling batch generator 206 determines whether to generate another historical sampling batch associated with relevant period. If so, control returns to block 1002. Otherwise, the example process of FIG. 10 ends and returns to complete the process of FIG. 9.

Figure 11:
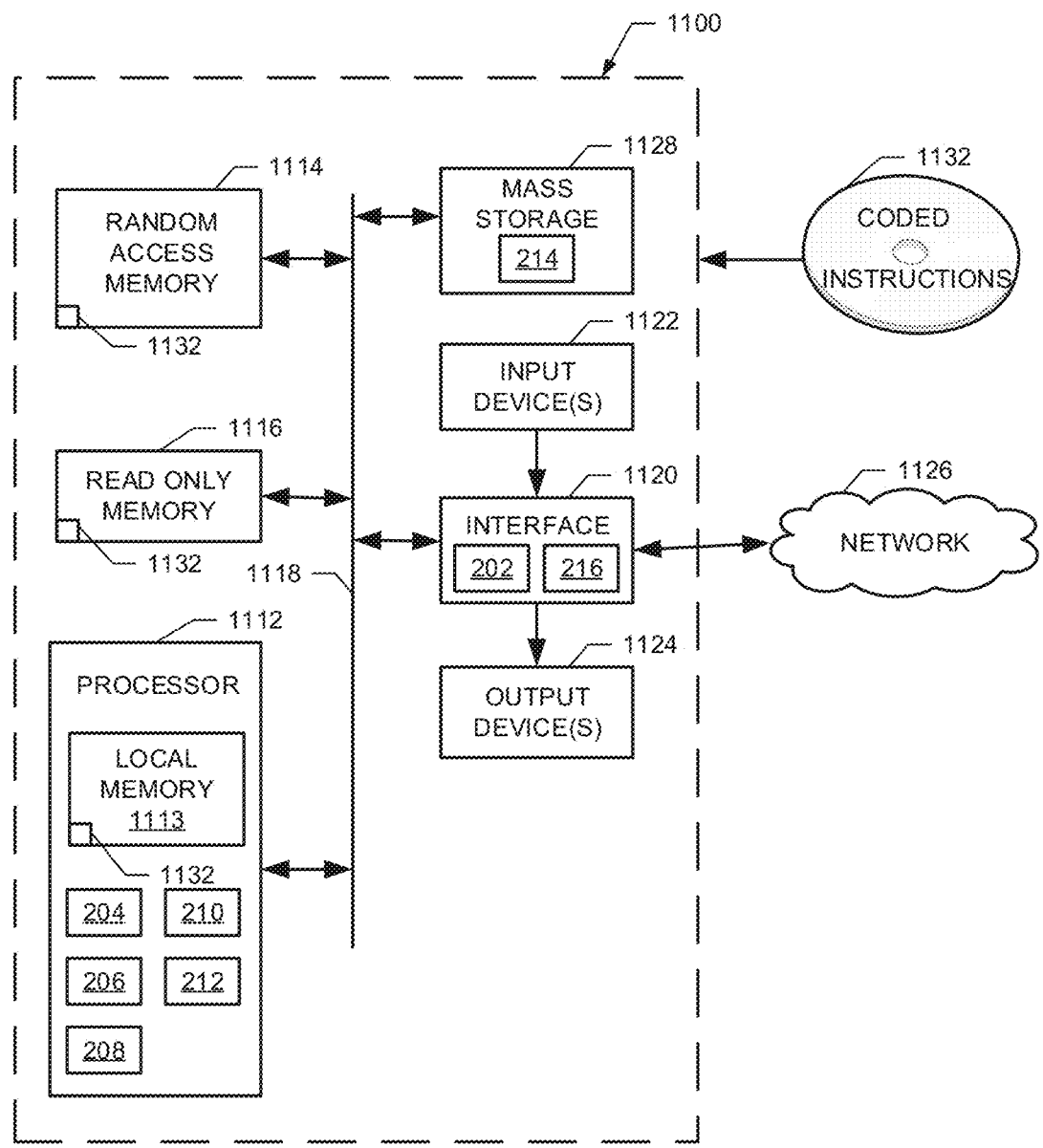
FIG. 11 is a schematic illustration of an example processor platform that may be used and/or programmed to carry out the example methods of FIG. 8-10, and/or, more generally, to implement the example predictive analytics engine of FIGS. 1 and/or 2.

FIG. 11 is a block diagram of an example processor platform 1100 structured to execute the instructions of FIGS. 8-10 to implement the predictive analytics engine 105 of FIGS. 1 and/or 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example residence time analyzer 204, the example historical sampling batch generator 206, the example batch model generator 208, the example virtual batch unit controller 210, and the example sampling batch analyzer 212.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC)

interface, and/or a PCI express interface. In this example, the interface circuit 1120 implements the example communication interface 202 and the example user interface 216.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In this example, the mass storage device includes the example database 214.

The machine executable instructions 1132 of FIGS. 8-10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that enable the generation of predictive analytics for continuous process control systems based on analytical techniques traditionally used for batch process control systems. The disclosed methods, apparatus and articles of manufacture improve the operation of continuous control system processes by providing operators with future predictions of the output of the process on an ongoing basis. More particularly, such information can enable an operator to become aware of and respond to potential deviations to a continuous process more quickly so that suitable remedial action may be taken sooner than later when the deviations become more serious.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   processor circuitry; and
   memory storing instructions that, when executed, cause the processor circuitry to:
   generate a first pool of historical sampling batches based on historical process data of a first instance of a continuous control system process, a portion of the historical process data associated with at least one of a startup period or a shutdown period of the first instance of the continuous control system process;
   generate an analytical model based on the first pool of historical sampling batches;
   validate the analytical model based on a second pool of historical sampling batches;
   implement a sampling batch on a virtual batch unit, the virtual batch unit to run in parallel with a second instance of the continuous control system process, the sampling batch corresponding to a discrete period of time of the second instance of the continuous control system process, the discrete period of time being shorter than a duration of the second instance of the continuous control system process, the continuous control system process implemented using a continuous process control system, the continuous process control system being different than a batch process control system, the virtual batch unit including input and output parameters corresponding to parameters associated with the continuous control system process;
   designate values for initial conditions of the virtual batch unit, different ones of the initial conditions corresponding to different ones of the parameters associated with the continuous control system process, the values for the initial conditions corresponding to values of the parameters associated with the second instance of the continuous control system process at a start of the discrete period of time, the initial conditions being a separate set of inputs for the virtual batch unit that are distinct from the input parameters, the initial conditions to remain fixed throughout the implementation of the sampling batch; and
   generate predictive analytic information indicative of a predicted quality of an output of the second instance of the continuous control system process at an end of the discrete period of time based on an analysis of the sampling batch relative to the analytical model, the predictive analytic information to facilitate at least one of maintenance or improvement of at least one of safety, performance, or efficiency of the second instance of the continuous control system process.

2. The apparatus of claim 1, wherein the processor circuitry is to designate values for initial conditions of the virtual batch unit as corresponding to values of the parameters associated with the second instance of the continuous control system process at a start of the discrete period of time, the initial conditions being separate from the input and output parameters.

3. The apparatus of claim 1, wherein the discrete period of time is a first discrete period of time and the sampling batch is a first sampling batch, the processor circuitry to implement a second sampling batch on the virtual batch unit, the second sampling batch corresponding to a second discrete period of time of the second instance of the continuous control system process, a start of the second discrete period of time corresponding to an end of the first discrete period of time, the predictive analytic information to indicate the predicted quality of the output of the second instance of the continuous control system process at an end of the second discrete period of time based on an analysis of the second sampling batch relative to the analytical model.

4. The apparatus of claim 3, wherein the processor circuitry is to cause a quality prediction interface to be rendered, the quality prediction interface graphically representing the predictive analytic information along a timeline corresponding to the first and second discrete periods of time.

5. The apparatus of claim 3, wherein the first discrete period of time has a same duration as the second discrete period of time.

6. The apparatus of claim 1, wherein the first pool of historical sampling batches includes:
a first set of historical sampling batches from the historical process data associated with the startup period of at least one of the first instance or other instances of the continuous control system process;
a second set of historical sampling batches from the historical process data associated with a steady state period of at least one of the first instance or the other instances of the continuous control system process; and
a third set of historical sampling batches from the historical process data associated with the shutdown period of at least one of the first instance or the other instances of the continuous control system process.

7. The apparatus of claim 6, wherein a first temporal spacing between start times of successive ones of the historical sampling batches in the first set of historical sampling batches is less than a second temporal spacing between start times of successive ones of the historical sampling batches in the second set of historical sampling batches.

8. The apparatus of claim 7, wherein the first temporal spacing is less than a temporal length of the historical sampling batches such that different ones of the historical sampling batches in the first set of historical sampling batches include overlapping portions of the historical process data.

9. The apparatus of claim 6, wherein a temporal length of ones of the historical sampling batches correspond to a length of the discrete period of time.

10. The apparatus of claim 6, wherein a number of historical sampling batches in the second set of historical sampling batches is greater than a number of historical sampling batches in the first set of historical sampling batches and greater than a number of historical sampling batches in the third set of historical sampling batches.

11. The apparatus of claim 1, wherein the processor circuitry is to generate the predictive analytic information without dynamic time warping.

12. The apparatus of claim 1, wherein the processor circuitry is to approximate a residence time for the second instance of the continuous control system process, the residence time indicative of a duration of time between when particular material is introduced as an input to the second instance of the continuous control system process and when the particular material has been processed into the output of the second instance of the continuous control system process, a length of the discrete period of time based on the residence time.

13. The apparatus of claim 12, wherein the length of the discrete period of time equals the approximation of the residence time.

14. The apparatus of claim 12, wherein the length of the discrete period of time is greater than the approximation of the residence time.

15. The apparatus of claim 14, wherein the length of the discrete period of time is a multiple of the approximation of the residence time ranging from two to four times the approximation of the residence time.

16. The apparatus of claim 1, wherein the processor circuitry is to:
generate a second pool of historical sampling batches based on historical process data of the second instance of the continuous control system process; and
update the analytical model based on at least the second pool of historical sampling batches.

17. A non-transitory computer readable medium comprising instructions that, when executed, cause a machine to at least:
generate a first pool of historical sampling batches based on historical process data of a first instance of a continuous control system process, a portion of the historical process data associated with at least one of a startup period or a shutdown period of the first instance of the continuous control system process;
generate an analytical model based on the first pool of historical sampling batches;
validate the analytical model based on a second pool of historical sampling batches;
implement a sampling batch on a virtual batch unit, the virtual batch unit to run in parallel with a second instance of the continuous control system process, the sampling batch corresponding to a discrete period of time of the second instance of the continuous control system process, the discrete period of time being shorter than a duration of the second instance of the continuous control system process, the continuous control system process implemented using a continuous process control system, the continuous process control system being different than a batch process control system, the virtual batch unit including input and output parameters corresponding to parameters associated with the continuous control system process;
designate values for initial conditions of the virtual batch unit, different ones of the initial conditions corresponding to different ones of the parameters associated with the continuous control system process, the values for the initial conditions corresponding to values of the parameters associated with the second instance of the continuous control system process at a start of the discrete period of time, the initial conditions being a separate set of inputs for the virtual batch unit that are distinct from the input parameters, the initial conditions to remain fixed throughout the implementation of the sampling batch; and
generate predictive analytic information indicative of a predicted quality of an output of the second instance of the continuous control system process at an end of the discrete period of time based on an analysis of the sampling batch relative to the analytical model, the predictive analytic information to facilitate at least one of maintenance or improvement of at least one of safety, performance, or efficiency of the second instance of the continuous control system process.

18. The non-transitory computer readable medium of claim 17, wherein the first pool of historical sampling batches includes:
a first set of historical sampling batches from the historical process data associated with the startup period of at least one of the first instance or other instances of the continuous control system process;
a second set of historical sampling batches from the historical process data associated with a steady state period of at least one of the first instance or the other instances of the continuous control system process; and
a third set of historical sampling batches from the historical process data associated with the shutdown period of at least one of the first instance or the other instances of the continuous control system process.

19. The non-transitory computer readable medium of claim 18, wherein a first temporal spacing between start times of successive ones of the historical sampling batches in the first set of historical sampling batches is less than a second temporal spacing between start times of successive ones of the historical sampling batches in the second set of historical sampling batches.

20. The non-transitory computer readable medium of claim 19, wherein the first temporal spacing is less than a temporal length of the historical sampling batches such that different ones of the historical sampling batches in the first set of historical sampling batches include overlapping portions of the historical process data.

21. A method comprising:
generating a first pool of historical sampling batches based on historical process data of a first instance of a continuous control system process, a portion of the historical process data associated with at least one of a startup period or a shutdown period of the first instance of the continuous control system process;
generating an analytical model based on the first pool of historical sampling batches;
validating the analytical model based on a second pool of historical sampling batches;
implementing, by executing instructions with at least one processor, a sampling batch on a virtual batch unit, the virtual batch unit to run in parallel with a second instance of the continuous control system process, the sampling batch corresponding to a discrete period of time of the second instance of the continuous control system process, the discrete period of time being shorter than a duration of the second instance of the continuous control system process, the continuous control system process implemented using a continuous process control system, the continuous process control system being different than a batch process control system, the virtual batch unit including input and output parameters corresponding to parameters associated with the continuous control system process;
designating, by executing the instructions with the at least one processor, values for initial conditions of the virtual batch unit, different ones of the initial conditions corresponding to different ones of the parameters associated with the continuous control system process, the values for the initial conditions corresponding to values of the parameters associated with the second instance of the continuous control system process at a start of the discrete period of time, the initial conditions being a separate set of inputs for the virtual batch unit that are distinct from the input parameters, the initial conditions to remain fixed throughout the implementation of the sampling batch; and
generating, by executing the instructions with the at least one processor, predictive analytic information indicative of a predicted quality of an output of the second instance of the continuous control system process at an end of the discrete period of time based on an analysis of the sampling batch relative to the analytical model, the predictive analytic information to facilitate at least one of maintenance or improvement of at least one of safety, performance, or efficiency of the second instance of the continuous control system process.

22. The method of claim 21, wherein the first pool of historical sampling batches includes:
a first set of historical sampling batches from the historical process data associated with the startup period of at least one of the first instance or other instances of the continuous control system process; and
a second set of historical sampling batches from the historical process data associated with a steady state period of at least one of the first instance or other instances of the continuous control system process, the steady state period different than the startup period.

23. The method of claim 22, wherein the first pool of historical sampling batches includes a third set of historical sampling batches from the historical process data associated with the shutdown period of at least one of the first instance or the other instances of the continuous control system process.

* * * * *